US011520727B2

(12) United States Patent
Mishra et al.

(10) Patent No.: US 11,520,727 B2
(45) Date of Patent: Dec. 6, 2022

(54) SIDEBAND SIGNALING IN A PERIPHERAL COMPONENT INTERCONNECT (PCI) EXPRESS (PCIE) LINK

(71) Applicant: QUALCOMM Incorporated, San Diego, CA (US)

(72) Inventors: Lalan Jee Mishra, San Diego, CA (US); Mohit Kishore Prasad, San Diego, CA (US); Richard Dominic Wietfeldt, San Diego, CA (US); James Lionel Panian, San Marcos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/952,229

(22) Filed: Nov. 19, 2020

(65) Prior Publication Data

US 2022/0156220 A1 May 19, 2022

(51) Int. Cl.
*G06F 13/42* (2006.01)

(52) U.S. Cl.
CPC .. *G06F 13/4221* (2013.01); *G06F 2213/0016* (2013.01); *G06F 2213/0026* (2013.01)

(58) Field of Classification Search
CPC ......... G06F 13/4221; G06F 2213/0016; G06F 2213/0026
See application file for complete search history.

(56) References Cited

U.S. PATENT DOCUMENTS

| 9,710,406 | B2 | 7/2017 | Pethe et al. |
| 10,353,853 | B1 | 7/2019 | Khamesra et al. |
| 2015/0019788 | A1* | 1/2015 | Adler ............... G06F 13/4221 710/313 |
| 2015/0309951 | A1* | 10/2015 | Breakstone ........ G05B 11/01 710/313 |
| 2016/0170914 | A1* | 6/2016 | Pethe ............... G06F 13/4221 710/20 |
| 2018/0314667 | A1* | 11/2018 | Long ............... G06F 13/4022 |
| 2019/0250930 | A1* | 8/2019 | Erez ................. G06F 1/3281 |
| 2020/0278733 | A1* | 9/2020 | Li ..................... G06F 1/28 |

OTHER PUBLICATIONS

International Search Report and Written Opinion for International Patent Application No. PCT/US2021/071834, dated Feb. 8, 2022, 12 pages.

* cited by examiner

*Primary Examiner* — Nimesh G Patel
(74) *Attorney, Agent, or Firm* — W&T/Qualcomm

(57) ABSTRACT

Alternate sideband signaling in a Peripheral Component Interconnect (PCI) express (PCIE) link may be enabled over existing sideband lines in a conventional PCIE link. For example, the default sideband communication of PCIE may be changed to a Universal Asynchronous receiver/transmitter (UART), line multiplex UART (LM-UART), serial peripheral interface (SPI), I2C, or I3C mode of communication. This change may be negotiated between the host and slave of the communication link, with a transition occurring after the negotiation concludes. The new mode of communication may include or encode the conventional PCIE sideband signals.

25 Claims, 9 Drawing Sheets

| D7 | D6 | D5 | D4 | D3 | D2 | D1 | D0 | |
|---|---|---|---|---|---|---|---|---|
| 0 | 0 | 0 | 0 | 0 | 0 | 0 | 0 | CLOCK REQUEST (GEAR#1) |
| 0 | 0 | 0 | 0 | 0 | 0 | 0 | 1 | CLOCK REQUEST (GEAR#2) |
| 0 | 0 | 0 | 0 | 0 | 0 | 1 | 0 | CLOCK REQUEST (GEAR#3) |
| 0 | 0 | 0 | 0 | 0 | 0 | 1 | 1 | WAKEUP |
| TBD | TBD | TBD | TBD | TBD | TBD | TBD | TBD | SIDEBAND TBD |
| : | : | : | : | : | : | : | : | : |
| TBD | TBD | TBD | TBD | TBD | TBD | TBD | TBD | SIDEBAND TBD |

SIDEBAND SIGNALING IN A PERIPHERAL COMPONENT INTERCONNECT (PCI) EXPRESS (PCIE) LINK

BACKGROUND

I. Field of the Disclosure

The technology of the disclosure relates generally to using sideband signaling in a Peripheral Component Interconnect (PCI) express (PCIE) link.

II. BACKGROUND

Computing devices abound in modern society. Part of the reason that computing devices are so prevalent is the myriad uses to which they can be put. The uses and functionality of such computing devices is typically a function of at least one integrated circuit (IC) communicating with a second IC over a communication link. One popular protocol that governs such communication links is the Peripheral Component Interconnect (PCI) express (PCIE) protocol. PCIE contemplates three dedicated sideband signals. Emerging use cases necessitate additional sideband channels.

SUMMARY OF THE DISCLOSURE

Aspects disclosed in the detailed description include sideband signaling in a Peripheral Component Interconnect (PCI) express (PCIE) link. In particular, alternate sideband channels may be enabled over existing sideband lines in a conventional PCIE link. For example, the default sideband communication of PCIE may be changed to a Universal Asynchronous receiver/transmitter (UART), line multiplex UART (LM-UART), serial peripheral interface (SPI), I2C, or I3C mode of communication. This change may be negotiated between the host and slave of the communication link, with a transition occurring after the negotiation concludes. The new mode of communication may include or encode the conventional PCIE sideband signals. By allowing the PCIE sideband lines to be repurposed to alternate modes, greater flexibility is provided for emerging use cases beyond those originally contemplated by the PCIE standard. This flexibility is achieved without having to add pins or additional conductive lines, thereby saving valuable real estate and preventing cost escalation for the computing device.

In this regard in one aspect, an integrated circuit (IC) is disclosed. The IC includes a communication link interface including at least one sideband link interface. The communication link interface is configured to couple to a communication link including a sideband line. The IC also includes a control circuit coupled to the communication link interface. The control circuit is configured to change an operational mode of the sideband line to an alternate mode.

In another aspect, method of communicating is disclosed. The method includes initially communicating over a sideband line in a communication link using a default mode. The method also includes changing modes for the sideband line. The method also includes subsequently communicating over the sideband line in a second sideband protocol.

DETAILED DESCRIPTION

Figure 1:
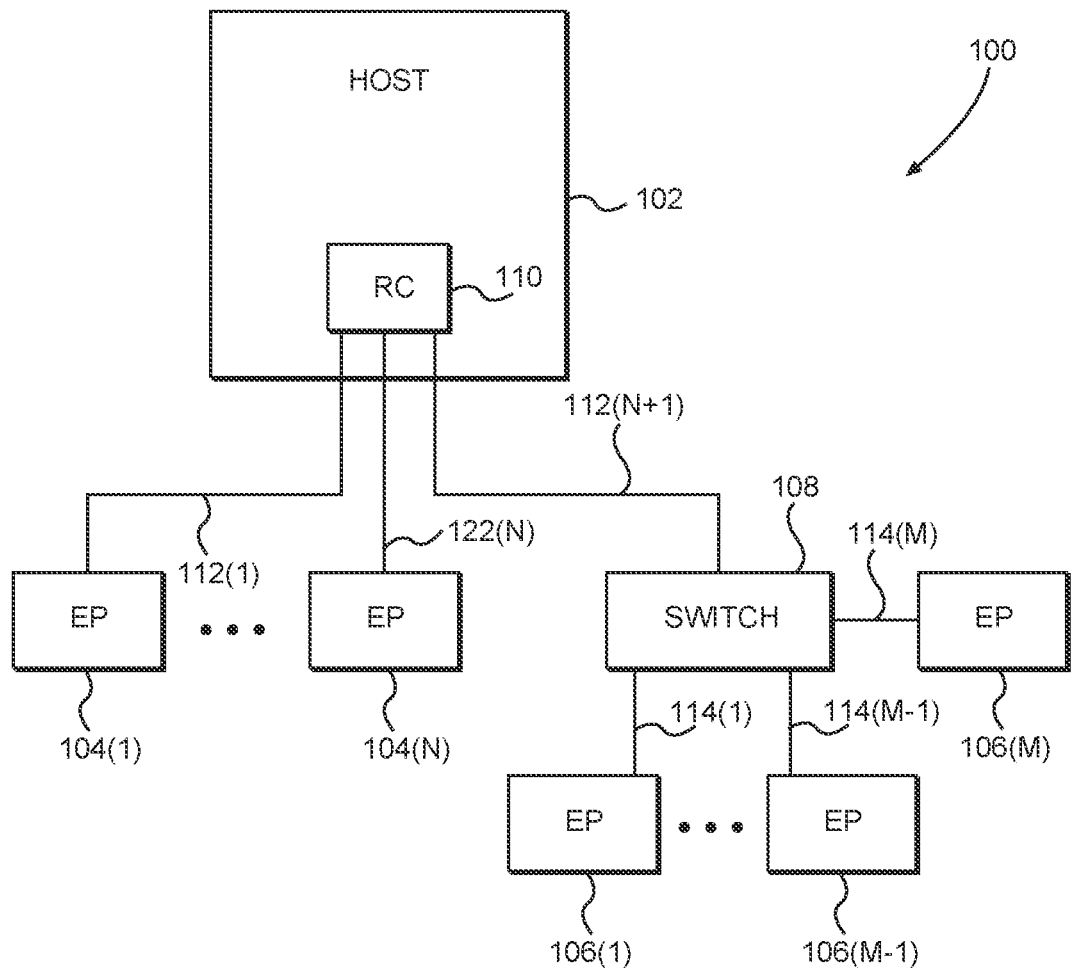
FIG. 1 is a block diagram of an exemplary computing system with devices coupled by Peripheral Component Interconnect (PCI) express (PCIE) buses.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include sideband signaling in a Peripheral Component Interconnect (PCI) express (PCIE) link. In particular, alternate sideband channels may be enabled over existing sideband lines in a conventional PCIE link. For example, the default sideband communication of PCIE may be changed to a Universal Asynchronous receiver/transmitter (UART), line multiplex UART (LM-UART), serial peripheral interface (SPI), I2C, or I3C mode of communication. This change may be negotiated between the host and slave of the communication link, with a transition occurring after the negotiation concludes. The new mode of communication may include or encode the conventional PCIE sideband signals. By allowing the PCIE sideband lines to be repurposed to alternate modes, greater flexibility is provided for emerging use cases beyond those originally contemplated by the PCIE standard. This flexibility is achieved without having to add pins or additional conductive lines, thereby saving valuable real estate and preventing cost escalation for the computing device.

Before addressing the particulars of the possible alternate mode sideband signaling, an overview of a PCIE system, a root complex, an endpoint, and a PCIE link having sideband lines therein are provided with reference to FIGS. 1-4. A discussion of a process through which the PCIE sideband lines may transition to an alternate sideband mode begins below with reference to FIG. 5.

In this regard, FIG. 1 illustrates a computing environment 100 with a host 102 coupled to a plurality of devices 104(1)-104(N) directly and to a second plurality of devices 106(1)-106(M) through a switch 108. The host 102 may include a PCIE root complex (RC) 110 that includes a link interface (not illustrated directly) that is configured to couple to plural PCIE links 112(1)-112(N+1). The switch 108 communicates to the devices 106(1)-106(M) through PCIE links 114(1)-114(M). The devices 104(1)-104(N) and 106 (1)-106(M) may be or may include PCIE endpoints. In a first exemplary aspect, the computing environment 100 may be a single computing device such as a computer with the host 102 being a central processing unit (CPU) and the devices 104(1)-104(N) and 106(1)-106(M) being internal components such as hard drives, disk drives, or the like. In a second exemplary aspect, the computing environment 100 may be a computing device where the host 102 is an integrated circuit (IC) on a board and the devices 104(1)-104(N) and 106(1)-106(M) are other ICs within the computing device. In a third exemplary aspect, the computing environment 100 may be a computing device having an internal host 102 coupled to external devices 104(1)-104(N) and 106(1)-106 (M) such as a server coupled to one or more external memory drives. Note that these aspects are not necessarily mutually exclusive in that different ones of the devices may be ICs, internal, or external relative to a single host 102.

PCIE links 112 and 114 may sometimes be described as a bus, although given the point-to-point nature of the links, such description is not common in the industry. Further, it should be appreciated that each link may include one or more physical conductors, such conductors sometimes referred to herein as lines.

Figure 2:
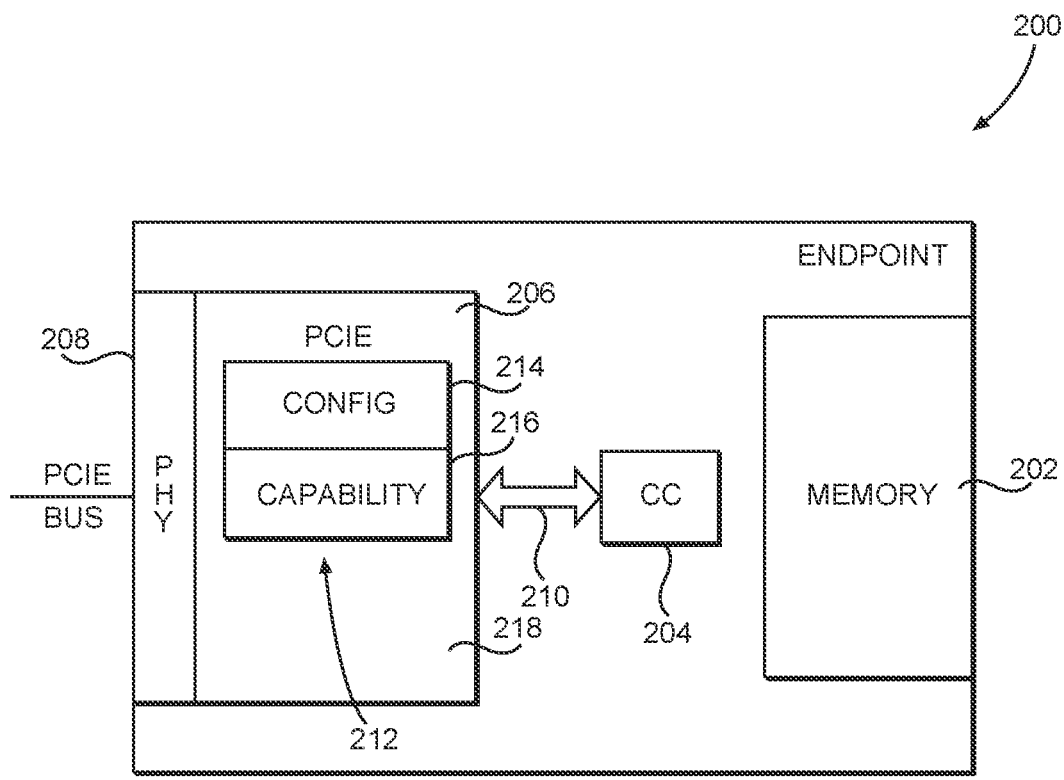
FIG. 2 illustrates a block diagram of an exemplary PCIE endpoint device and, particularly, configuration registers within the endpoint.

FIG. 2 provides a block diagram of a device 200 that may be one of the devices 104(1)-104(N) or the devices 106(1)-106(M). In particular, the device 200 acts as an endpoint in a PCIE system, and may be, for example, a memory device that includes a memory element 202 and a control circuit 204. Further, the device 200 includes a PCIE hardware element 206 that includes a link interface configured to couple to a PCIE link. The PCIE hardware element 206 may include a physical layer (PHY) 208 that is, or works with, the communication link interface to communicate over the PCIE link. The control circuit 204 communicates with the PCIE hardware element 206 through a chip or system bus 210. The PCIE hardware element 206 may further include a plurality of registers 212. The registers 212 may be conceptually separated into configuration registers 214 and capability registers 216. The configuration registers 214 and the capability registers 216 are defined by the original PCI standard, and more recent devices that include the registers 214 and 216 are backward compatible with legacy devices.

Figure 3:
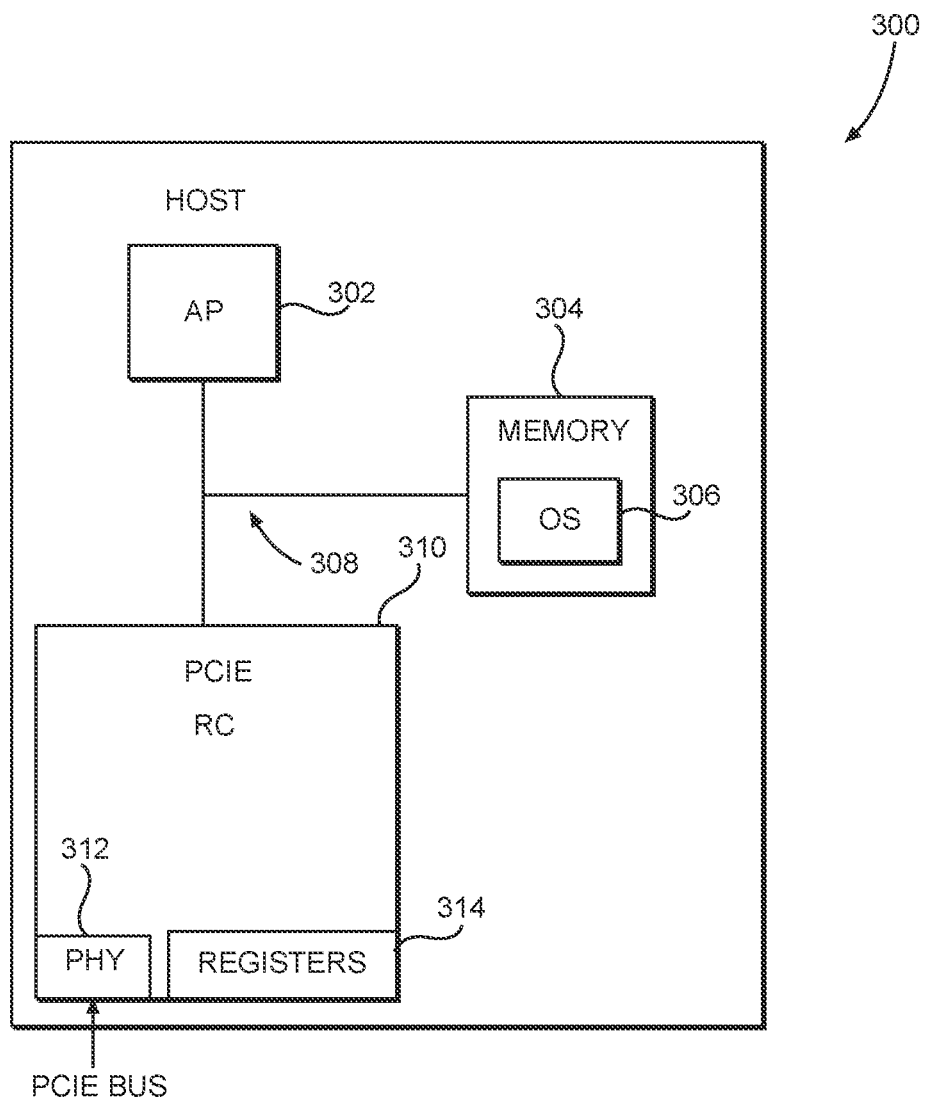
FIG. 3 illustrates a block diagram of a host having a processor and PCIE hardware with registers according to an exemplary aspect of the present disclosure.

Similarly, FIG. 3 illustrates a host 300 which may be the host 102 of FIG. 1. The host 300 may include an application processor 302 or other processor core which communicates with a memory element 304 having an operating system 306 operating therewith. A chip or system bus 308 interconnects the application processor 302 with the memory element 304 and a PCIE RC 310. The application processor 302 or the PCIE RC 310 may include a control circuit (not shown explicitly) that operates according to the present disclosure. The PCIE RC 310 may include a PHY 312 that works with or is a communication link interface configured to couple to a PCIE link. The PCIE RC 310 further includes a plurality of registers 314.

Figure 4:
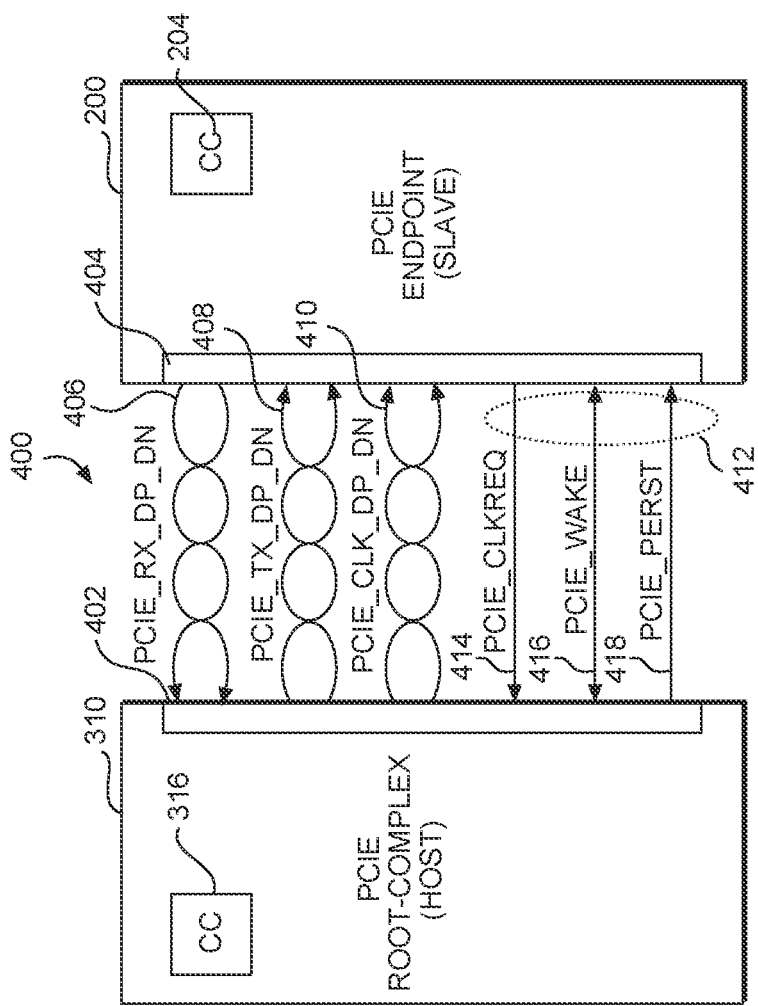
FIG. 4 provides a more detailed illustration of a PCIE link with sideband lines specifically shown.

FIG. 4 illustrates an exemplary aspect of a PCIE link 400 (which may be equivalent to links 112, 114). The PCIE link 400 extends between the PCIE RC 310 and the device 200 and particularly between a root complex link interface 402 and an endpoint link interface 404. As described above, the PCIE RC 310 may include a control circuit 316 and the device 200 may include the control circuit 204.

With continued reference to FIG. 4, the PCIE link 400 may be divided into a high-speed link that may include high-speed lines 406 and 408 (e.g., PCIE_RX_DP_DN and PCIE_TX_DP_DN) and a clock line 410. It should be appreciated that the lines 406, 408, and 410 may be differential lines as is well understood. In addition to the high-speed link, the PCIE link 400 may include a sideband link 412, which may include a PCIE clock request line 414, a PCIE wakeup request line 416, and a PCIE peripheral reset line 418. It should be appreciated that the respective interfaces 402, 404 may include a high-speed link interface that works with the high-speed lines 406, 408 and a sideband link interface that works with the sideband lines 414, 416, and 418.

The basic sideband link 412 and the three lines 414, 416, and 418 are described in the PCIE specification. Exemplary aspects of the present disclosure allow the sideband link 412 to be repurposed to handle other sideband signaling and used in ways not contemplated by the PCIE specification. When the PCIE specification was proposed, the need for sideband signaling was relatively limited. Accordingly, the sideband link 412 included only three lines to meet the sideband signaling needs. More recently, emerging use cases demand additional sideband signals. For example, a multi-mode reset signal may be used to implement multi-level reset functionality, but is not available. Likewise, there may be specific clock gear (e.g., frequency) requirements that would be appropriate to send as a sideband signal. Still other sideband signals may be needed in the future. The three lines 414, 416, and 418 of the sideband link 412 are not designed to support such sideband signals. One solution would be to add pins to the interfaces 402, 404 and lines to the sideband link 412. However, this solution increases expense both because it adds pins and it increases the size of the IC to accommodate the additional pins. Further, the additional lines may have an associated expense in materials and space usage. In general, industry trends are opposed to increased expense or space usage, making this solution commercially unattractive.

Exemplary aspects of the present disclosure allow the sideband link 412 to be repurposed and the same three lines 414, 416, and 418 to carry additional sideband signals in an alternate signaling mode such as UART, LM-UART, SPI, I2C, or I3C. Still other modes may be used if desired, but these alternate modes are readily amenable to current requirements. By reconfiguring the sideband link 412 to operate in such alternate modes, the need for additional pins and additional lines is avoided, providing cost and space savings while still provided the desired new functionality. In an exemplary aspect, the host negotiates with the endpoint over the high speed link to switch modes on the sideband link 412. Subsequent communication over the sideband link 412 occurs in the new mode.

Figure 5:
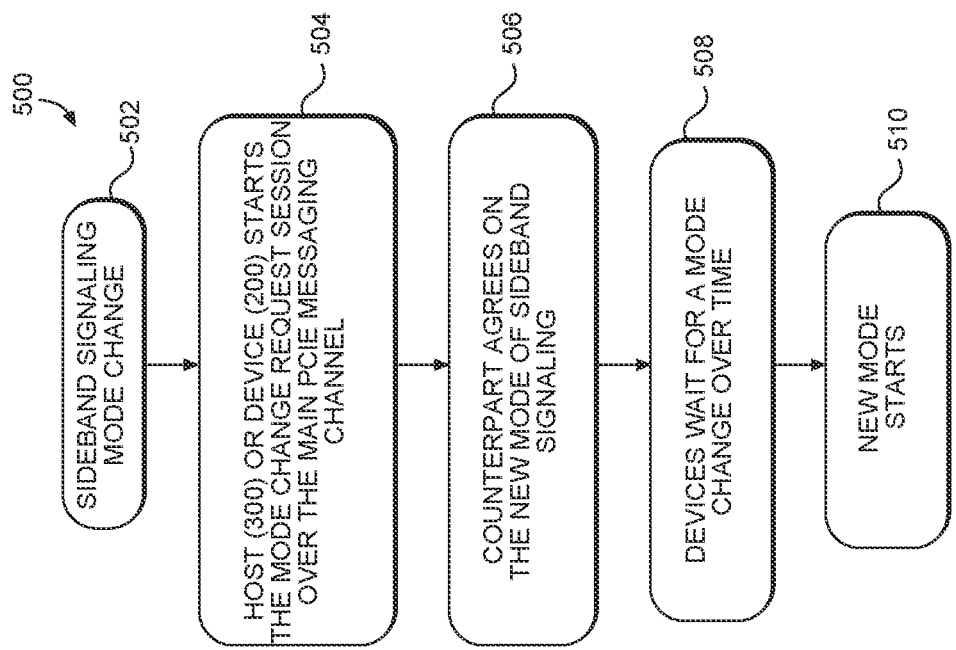
FIG. 5 is a flowchart illustrating an exemplary process for transitioning to an alternate mode where the sideband lines operate according to a different protocol.

FIG. 5 illustrates a process 500 for switching modes on the sideband link 412. Specifically, the process 500 starts with a decision to begin a sideband signaling mode change (block 502). The host 300 or the device 200 starts the mode change request session over the main PCIE messaging channel (e.g., the high-speed link) (block 504). Note that the form of the change request may be varied. In a first example, the change request may be a command from one entity to the other, where the command is embedded in the body of a signal. In another example, the command may be embedded in a transaction layer packet (TLP). In still another example, the command may be embedded in a TLP prefix. These commands (regardless of format) may write to a control register in the device 200 so as to cause the device 200 to operate in the alternate mode (e.g., setting a bit in the register). The non-requesting entity (i.e., the counterpart) agrees on the new mode of sideband signaling (block 506) and the devices 200, 300 wait for a mode change over time (block 508). The new mode then starts (block 510). It should be appreciated that before the process 500 begins, the host 300 may initially check to see if the device 200 is capable of operating in an alternate mode. Such a check may be done by reading a configuration or capability register in the device 200, by direct interrogation of capability, or other technique as needed or desired.

Figure 6:
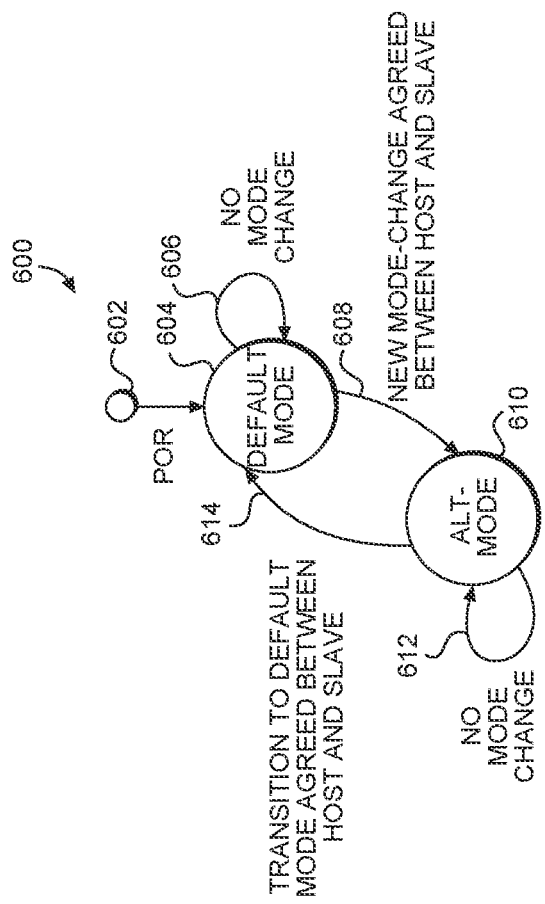
FIG. 6 illustrates possible states of a state machine operating according to the process of FIG. 5.

Changes in a state machine 600 corresponding to the process 500 are illustrated in FIG. 6, where after a power on reset 602, the state machine 600 is initially in a default mode 604. Normal operation results in no mode change (line 606), but if a new mode or second sideband protocol has been requested and agreed on between the host and slave (line 608), the state machine 600 operates in an alternate mode 610 (e.g., operates in the second sideband protocol). The state machine 600 remains in the alternate mode 610 as long as there is no further mode change (line 612), but returns to the default mode 604 when agreed on between the host and slave (line 614).

Figure 7:
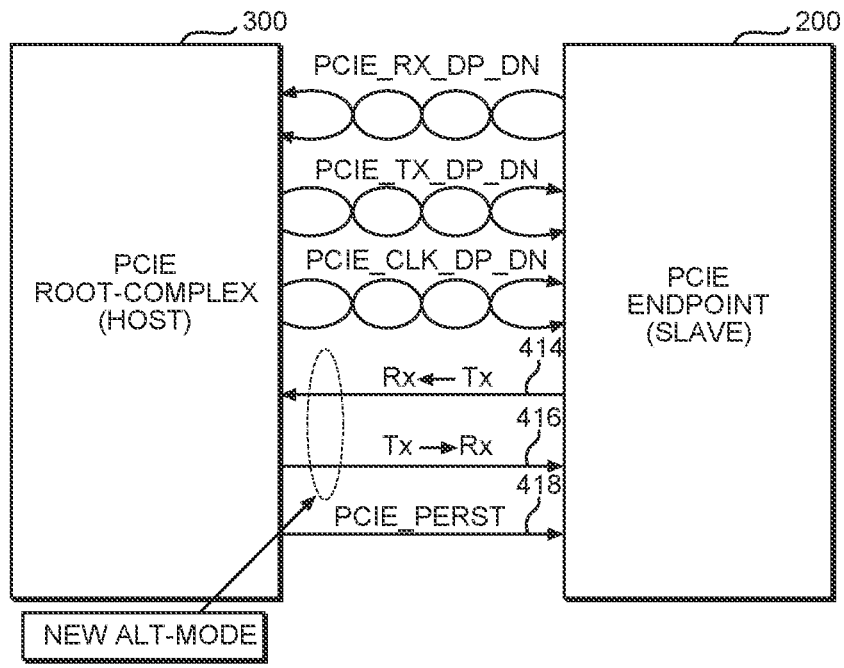
FIG. 7 illustrates how sideband lines are used in a UART or LM-UART mode.

Operation in an alternate mode causes the lines 414, 416, and 418 to operate differently than they would in a default mode. For example, in a UART or LM-UART alternate mode, as illustrated in FIG. 7, the line 414 provides a channel for the device 200 to send data and commands to the host 300. Likewise, the line 416 provides a channel for the host 300 to send data and commands to the device 200. That is, a first line of the sideband link 412 operates as an outgoing data line and a second line of the sideband link 412 operates as an incoming data line. The PCIE peripheral reset line 418 remains unchanged. In an exemplary aspect, the new channels may operate at four megahertz (4 MHz), and the device 200 may oversample incoming signals.

Figure 8:
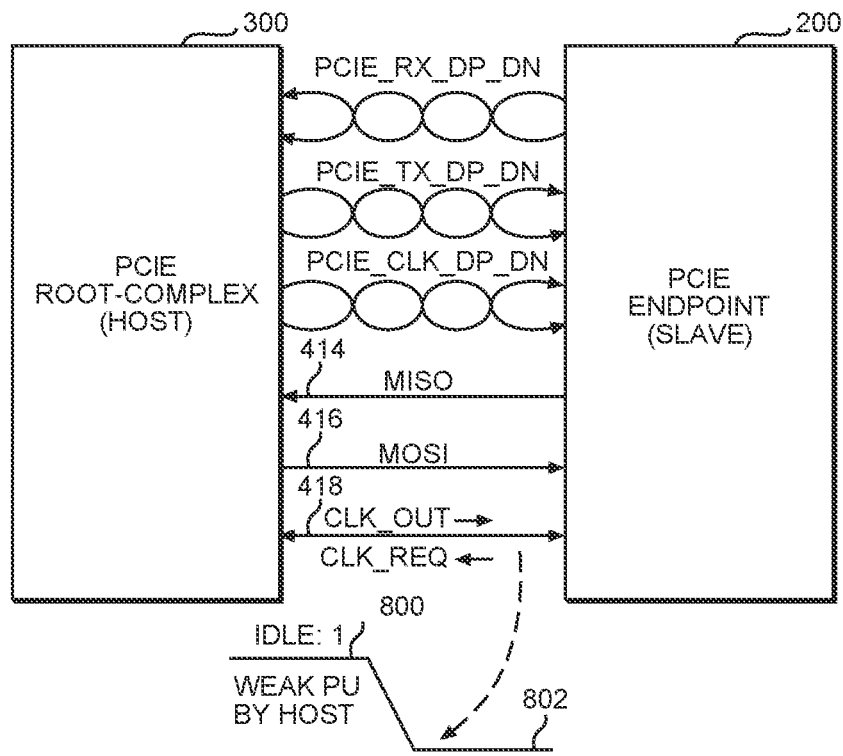
FIG. 8 illustrates how sideband lines are used in a serial peripheral interface (SPI) mode.

All three lines 414, 416, 418 have new functions in an SPI mode as illustrated in FIG. 8. Line 414 becomes a master in-slave out (MISO) channel, while line 416 becomes a master out-slave in (MOSI) channel. That is, a first line of the sideband link 412 operates as an outgoing data line and a second line of the sideband link 412 operates as an incoming data line. Line 418 operates as a clock line where the host 300 provides a clock signal for the MISO/MOSI channels. When the clock is idle, the host 300 may weakly hold the line 418 at a logical high 800, and the device 200 may request a clock signal by pulling the line 418 to a logical low 802 after which the host 300 may start to drive the clock after a fixed delay. In an exemplary aspect, the clock signal may operate at 52 MHz.

Figure 9:
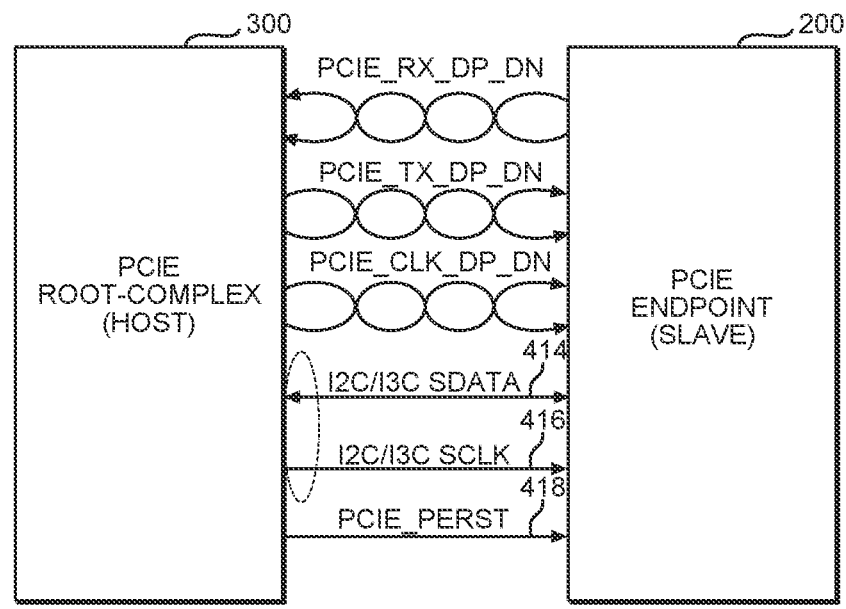
FIG. 9 illustrates how sideband lines are used in an I2C or I3C mode.

FIG. 9 illustrates sideband line usage in an I2C or I3C mode. Specifically, the line 414 is a bidirectional data line while line 416 provides a clock signal for the line 414 and the line 418 remains a peripheral reset channel.

It should be appreciated that once the sideband channel has been changed to an alternate mode, commands and messages that are sent via the sideband data channels (e.g., MISO, MOSI, SDATA) may take any number of forms. Likewise, the number and type of commands may be varied as needed or desired. In the interests of a more robust discussion, and by way of example, a few exemplary commands and the format therefor are provided with reference to FIG. 10. Specifically, a table 1000 populated by an exemplary set of encoded commands is illustrated.

In any of the alternate modes used by the sideband channel (e.g., I2C, I3C, SPI, UART, LM-UART), a packet containing a command may be formed from, for example, eight bits (D0-D7), which may be programmed to encode, by way of further example, specific clock gear requests, a wake up request, particular reset functionality, or the like. Exemplary clock gear requests 1002(1)-1002(3) have different values in bits D0-D7 and may correspond to a request to use different frequencies for the high-speed link. Such clock gear requests may be sent on a sideband channel as part of set up or the like so that signaling at the high frequencies starts at the desired gear instead of having to negotiate through a series of "safe" or "slow" speeds. The table 1000 also shows that many possible commands may initially be reserved and defined at a later time. Other arrangements of bits may be used to provide the same commands without departing from the present disclosure.

Figures 10, 11:
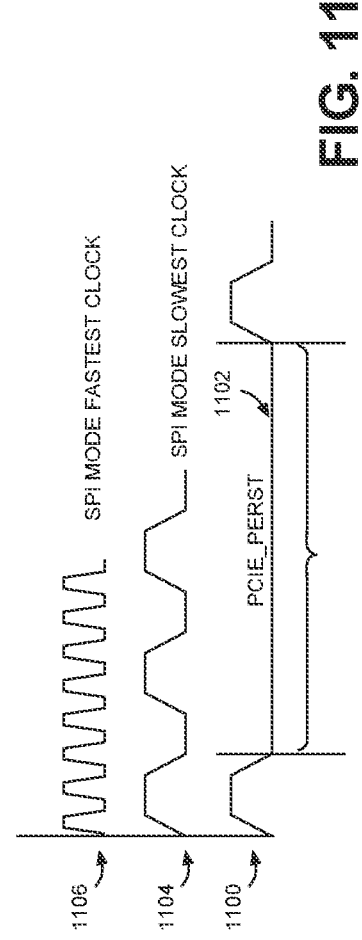
FIG. 10 provides a table of possible messaging enabled by alternate sideband modes according to the present disclosure.
FIG. 11 provides exemplary signals to effectuate a reset when operating in an I2C or I3C mode.

There may be times when there is a need or desire to reset a device using the sideband channel. For UART, LM-UART, I2C, and I3C, this function is readily available since reset commands are typically sent on a PCIE_PERST line, which is preserved in each of these alternate modes. However, for SPI, a new way to signal a reset is used. FIG. 11 provides an example reset signal 1100 for an SPI mode. Specifically, the reset signal 1100 is an extended logical low 1102 where extended, in this context, means that the length of the logical low 1102 is longer than a plurality of periods of a slow clock signal 1104 and is longer than many periods of a fast clock signal 1106. The slow clock signal 1104 is the slowest clock signal that the SPI mode supports, and the fast clock signal 1106 is the fastest clock signal that the SPI mode supports.

The sideband signaling in a PCIE link according to aspects disclosed herein may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, a drone, and a multicopter.

Figure 12:
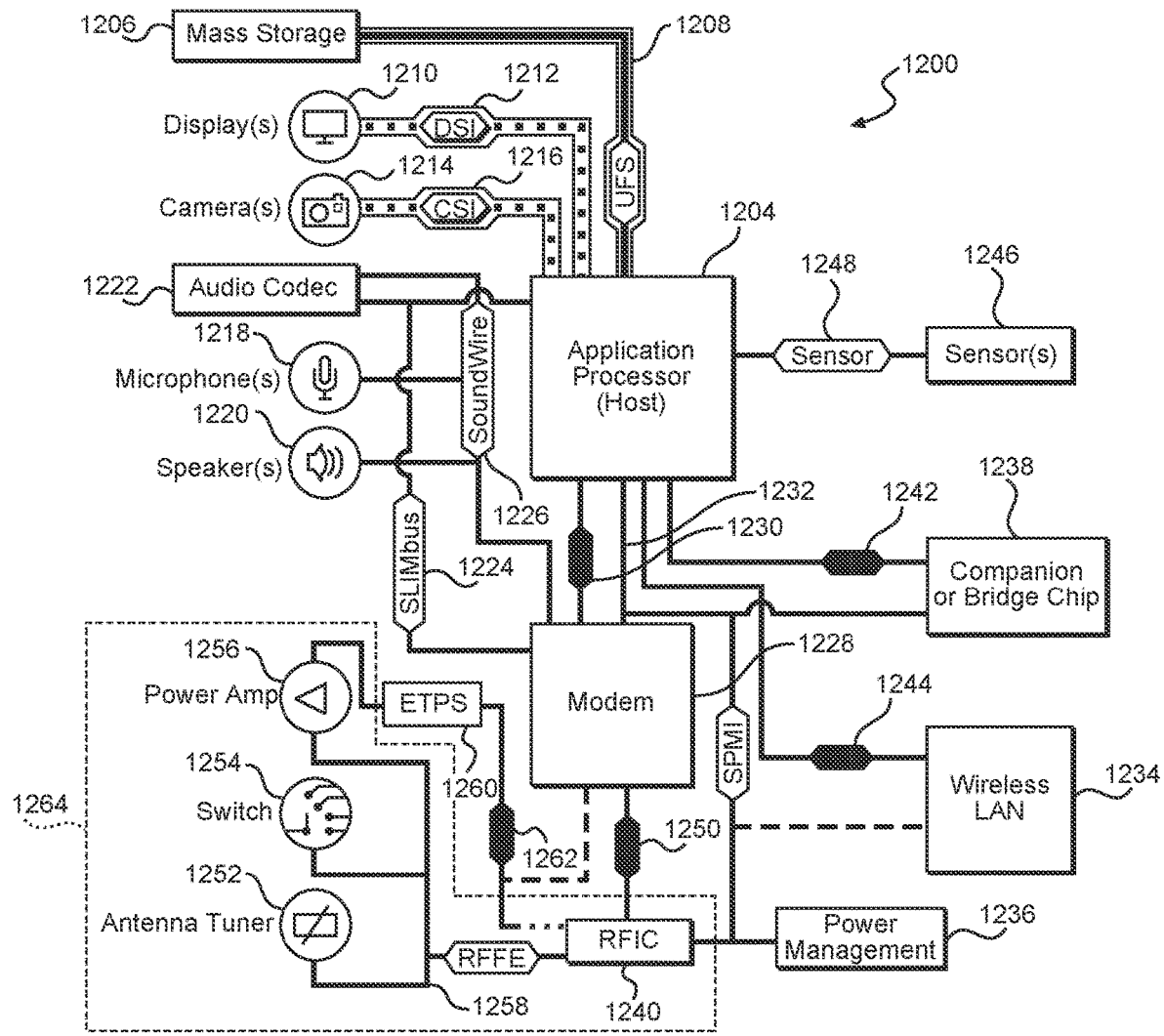
FIG. 12 is a block diagram of an exemplary mobile computing device that may include one or more PCIE links operating according to the present disclosure.

In this regard, FIG. 12 is a system-level block diagram of an exemplary mobile terminal 1200 such as a smart phone, mobile computing device tablet, or the like. While a mobile terminal having a SOUNDWIRE bus is particularly contemplated as being capable of benefiting from exemplary aspects of the present disclosure, it should be appreciated that the present disclosure is not so limited and may be useful in any system having a time division multiplexed (TDM) bus.

With continued reference to FIG. 12, the mobile terminal 1200 includes an application processor 1204 (sometimes referred to as a host) that communicates with a mass storage element 1206 through a universal flash storage (UFS) bus 1208. The application processor 1204 may further be connected to a display 1210 through a display serial interface (DSI) bus 1212 and a camera 1214 through a camera serial interface (CSI) bus 1216. Various audio elements such as a microphone 1218, a speaker 1220, and an audio codec 1222 may be coupled to the application processor 1204 through a serial low-power interchip multimedia bus (SLIMbus) 1224. Additionally, the audio elements may communicate with each other through a SOUNDWIRE bus 1226. A modem 1228 may also be coupled to the SLIMbus 1224 and/or the SOUNDWIRE bus 1226. The modem 1228 may further be connected to the application processor 1204 through a peripheral component interconnect (PCI) or PCI express (PCIe) bus 1230 and/or a system power management interface (SPMI) bus 1232.

With continued reference to FIG. 12, the SPMI bus 1232 may also be coupled to a local area network (LAN or WLAN) IC (LAN IC or WLAN IC) 1234, a power management integrated circuit (PMIC) 1236, a companion IC (sometimes referred to as a bridge chip) 1238, and a radio frequency IC (RFIC) 1240. It should be appreciated that separate PCI buses 1242 and 1244 may also couple the application processor 1204 to the companion IC 1238 and the WLAN IC 1234. The application processor 1204 may further be connected to sensors 1246 through a sensor bus 1248. The modem 1228 and the RFIC 1240 may communicate using a bus 1250.

With continued reference to FIG. 12, the RFIC 1240 may couple to one or more RFFE elements, such as an antenna tuner 1252, a switch 1254, and a power amplifier 1256 through a radio frequency front end (RFFE) bus 1258. Additionally, the RFIC 1240 may couple to an envelope tracking power supply (ETPS) 1260 through a bus 1262, and the ETPS 1260 may communicate with the power amplifier 1256. Collectively, the RFFE elements, including the RFIC 1240, may be considered an RFFE system 1264. It should be appreciated that the RFFE bus 1258 may be formed from a clock line and a data line (not illustrated).

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The devices described herein may be employed in any circuit, hardware component, IC, or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein, but is to be accorded the widest scope consistent with the principles and novel features disclosed herein.

Implementation examples are described in the following numbered aspects:

1. An integrated circuit (IC), comprising:
    a communication link interface comprising at least one sideband link interface, the communication link interface configured to couple to a communication link comprising a sideband line; and
    a control circuit coupled to the communication link interface, the control circuit configured to:
    change an operational mode of the sideband line to an alternate mode.
2. The IC of aspect 1, wherein the IC comprises a Peripheral Component Interconnect (PCI) express (PCIE) root complex.
3. The IC of aspect 1 or 2, wherein the communication link interface further comprises at least one high-speed link interface.
4. The IC of any one of aspects 1 to 3, wherein the control circuit is further configured to send a command over the sideband line through the at least one sideband link interface, wherein the command complies with the alternate mode.

5. The IC of any one of aspects 1 to 4, wherein the control circuit is further configured to read a register of a remote IC across the communication link to determine that the remote IC is capable of operating according to the alternate mode.

6. The IC of any one of aspects 1 to 5, wherein the control circuit is further configured to interrogate a remote IC to determine that the remote IC is capable of operating according to the alternate mode.

7. The IC of any one of aspects 1 to 6, wherein the control circuit is further configured to instruct a remote IC to operate in the alternate mode.

8. The IC of aspect 7, wherein the control circuit is configured to instruct the remote IC by setting a bit in a control register.

9. The IC of aspect 7, wherein the control circuit is configured to instruct the remote IC by issuing a transaction layer packet (TLP) command.

10. The IC of aspect 7, wherein the control circuit is configured to instruct the remote IC by issuing a command in a transaction layer packet (TLP) prefix.

11. The IC of any one of aspects 1 to 10, wherein the control circuit is configured to change the operational mode to one of Universal Asynchronous receiver/transmitter (UART), serial peripheral interface (SPI), I2C, and I3C.

12. The IC of any one of aspects 1 to 11, wherein a first line of the sideband line operates as an outgoing data line and a second line of the sideband line operates as an incoming data line.

13. The IC of aspect 1, wherein the IC comprises a Peripheral Component Interconnect (PCI) express (PCIE) endpoint.

14. The IC of aspect 13, wherein the control circuit is further configured to receive a command over the sideband line through the at least one sideband link interface, wherein the command complies with the alternate mode.

15. The IC of any one of aspects 13 or 14, further comprising a register indicating an alternate mode capability, the register configured to be read by a remote IC across the communication link.

16. The IC of any one of aspects 13 to 15, wherein the control circuit is further configured to respond to an interrogation by a remote IC to indicate that the IC is capable of operating according to the alternate mode.

17. The IC of any one of aspects 13 to 16, wherein the control circuit is further configured to receive a command from a remote IC to operate in the alternate mode.

18. The IC of aspect 17, wherein the control circuit is configured to receive the command from the remote IC by the remote IC setting a bit in a register.

19. The IC of aspect 17, wherein the control circuit is configured to receive the command in a transaction layer packet (TLP) command.

20. The IC of aspect 17, wherein the control circuit is configured to receive the command in a transaction layer packet (TLP) prefix.

21. The IC of any one of aspects 1 to 20 integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

22. A method of communicating comprising:
    initially communicating over a sideband line in a communication link using a default mode;
    changing modes for the sideband line; and
    subsequently communicating over the sideband line in a second sideband protocol.

23. The method of aspect 22, wherein communicating over the sideband line comprises communicating over a Peripheral Component Interconnect (PCI) express (PCIE) communication link.

24. The method of aspect 22 or 23, wherein subsequently communicating over the sideband line comprises communicating using one of Universal Asynchronous receiver/transmitter (UART), serial peripheral interface (SPI), I2C, and I3C.

25. The method of any one of aspects 22 to 24, wherein communicating over the sideband line comprises communicating over a clock request line, a wakeup request line, or a peripheral reset line.

26. The method of any one of aspects 22 to 25, further comprising determining whether a remote integrated circuit (IC) is capable of communicating using an alternate mode.

27. The method of any one of aspects 22 to 26, further comprising indicating to a remote IC that a first IC is capable of communicating using an alternate mode.

What is claimed is:

1. An integrated circuit (IC), comprising:
    a communication link interface comprising:
        at least one sideband link interface, the communication link interface configured to couple to a communication link comprising a sideband line; and
        at least one high-speed link interface; and
    a control circuit coupled to the communication link interface, the control circuit configured to:
        operate the sideband line in a default mode initially;
        subsequently, instruct a remote IC to operate in an alternate mode using the at least one high-speed link interface;
        change an operational mode of the sideband line to the alternate mode; and
        subsequently, change the operational mode from the alternate mode back to the default mode.

2. The IC of claim 1, wherein the IC comprises a Peripheral Component Interconnect (PCI) express (PCIE) root complex.

3. The IC of claim 1, wherein the control circuit is further configured to send a command over the sideband line through the at least one sideband link interface, wherein the command complies with the alternate mode.

4. The IC of claim 1, wherein the control circuit is further configured to read a register of the remote IC across the communication link to determine that the remote IC is capable of operating according to the alternate mode.

5. The IC of claim 1, wherein the control circuit is further configured to interrogate the remote IC to determine that the remote IC is capable of operating according to the alternate mode.

6. The IC of claim 1, wherein the control circuit is configured to instruct the remote IC using the at least one high-speed link interface by setting a bit in a control register.

7. The IC of claim 1, wherein the control circuit is configured to instruct the remote IC by issuing a transaction layer packet (TLP) command using the at least one high-speed link interface.

8. The IC of claim 1, wherein the control circuit is configured to instruct the remote IC by issuing a command in a transaction layer packet (TLP) prefix using the at least one high-speed link interface.

9. The IC of claim 1, wherein the control circuit is configured to change the operational mode to one of Universal Asynchronous receiver/transmitter (UART), serial peripheral interface (SPI), I2C, and I3C.

10. The IC of claim 1, wherein a first line of the sideband line operates as an outgoing data line and a second line of the sideband line operates as an incoming data line.

11. The IC of claim 1 integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

12. An integrated circuit (IC), comprising:
a communication link interface comprising:
at least one sideband link interface, the communication link interface configured to couple to a communication link comprising a sideband line, wherein a first line of the sideband line operates as an outgoing data line and a second line of the sideband line operates as an incoming data line; and
at least one high-speed link interface; and
a control circuit coupled to the communication link interface, the control circuit configured to:
operate initially in a default mode;
subsequently, instruct a remote IC to operate in an alternate mode using the at least one high-speed link interface;
subsequently, change an operational mode of the sideband line to the alternate mode; and
subsequently, change the operational mode from the alternate mode back to the default mode;
wherein the IC comprises a Peripheral Component Interconnect (PCI) express (PCIE) endpoint.

13. The IC of claim 12, wherein the control circuit is further configured to receive a command over the sideband line through the at least one sideband link interface, wherein the command complies with the alternate mode.

14. The IC of claim 12, further comprising a register indicating a n alternate mode capability, the register configured to be read by the remote IC across the communication link.

15. The IC of claim 12, wherein the control circuit is further configured to respond to an interrogation by the remote IC to indicate that the IC is capable of operating according to the alternate mode.

16. The IC of claim 12, wherein the control circuit is further configured to receive a command over the at least one high-speed link interface from the remote IC to operate in the alternate mode.

17. The IC of claim 16, wherein the control circuit is configured to receive the command from the remote IC by the remote IC setting a bit in a register.

18. The IC of claim 16, wherein the control circuit is configured to receive the command in a transaction layer packet (TLP) command.

19. The IC of claim 16, wherein the control circuit is configured to receive the command in a transaction layer packet (TLP) prefix.

20. A method of communicating comprising:
initially communicating over a sideband line in a communication link using a default mode;
subsequently processing a command over a high-speed line in the communication link to operate in a second sideband protocol;
changing modes for the sideband line from the default mode to an alternate mode based on the second sideband protocol;
after changing the modes, communicating over the sideband line in the second sideband protocol; and
subsequently changing back to the default mode.

21. The method of claim 20, wherein communicating over the sideband line comprises communicating over a Peripheral Component Interconnect (PCI) express (PCIE) communication link.

22. The method of claim 20, wherein communicating over the sideband line after changing the modes comprises communicating using one of Universal Asynchronous receiver/transmitter (UART), serial peripheral interface (SPI), I2C, and I3C.

23. The method of claim 20, wherein communicating over the sideband line comprises communicating over a clock request line, a wakeup request line, or a peripheral reset line.

24. The method of claim 20, further comprising determining whether a remote integrated circuit (IC) is capable of communicating using the alternate mode.

25. The method of claim 20, further comprising indicating to a remote IC that a first IC is capable of communicating using the alternate mode.

* * * * *